United States Patent
Atohira

(10) Patent No.: US 10,710,240 B2
(45) Date of Patent: Jul. 14, 2020

(54) PROGRAMMING DEVICE FOR WELDING ROBOT AND PROGRAMMING METHOD FOR WELDING ROBOT

(71) Applicant: FANUC CORPORATION, Yamanashi (JP)

(72) Inventor: Hiroyuki Atohira, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 14 days.

(21) Appl. No.: 16/105,237

(22) Filed: Aug. 20, 2018

(65) Prior Publication Data

US 2019/0077016 A1   Mar. 14, 2019

(30) Foreign Application Priority Data

Sep. 12, 2017   (JP) .................................. 2017-174476

(51) Int. Cl.
*B25J 9/16*   (2006.01)
*G05B 19/4093*   (2006.01)
(Continued)

(52) U.S. Cl.
CPC .......... *B25J 9/1605* (2013.01); *G05B 19/182* (2013.01); *G05B 19/4093* (2013.01); *G05B 19/4097* (2013.01); *G05B 2219/45135* (2013.01)

(58) Field of Classification Search
CPC .. B25J 9/1605; G05B 19/182; G05B 19/4093; G05B 19/4097; G05B 2219/45135
See application file for complete search history.

(56) References Cited

U.S. PATENT DOCUMENTS 5,845,053 A * 12/1998 Watanabe ................ B23K 9/12
  700/262
6,124,693 A *  9/2000 Okanda .............. G05B 19/4086
  318/564

(Continued)

FOREIGN PATENT DOCUMENTS

CN       103454971 A     12/2013
CN       105487481 A      4/2016
(Continued)

OTHER PUBLICATIONS

Decision to Grant a Patent dated Jul. 2, 2019, for Japanese Patent Application No. 2017-174476.
(Continued)

*Primary Examiner* — Thomas C Lee
*Assistant Examiner* — Michael Tang
(74) *Attorney, Agent, or Firm* — Karceski IP Law, PLLC

(57) ABSTRACT

A programming device for a welding robot includes a model obtaining unit that obtains three-dimensional models; a welding-line specifying unit that specifies a welding line; a target-angle setting unit that sets a target angle; an advance-angle setting unit that sets an advance angle; a coordinate-system setting unit that sets a tentative coordinate system having a first axis set on the basis of the welding line, a second axis perpendicular to the first axis and parallel to a face of one of workpieces to be welded together, and a tool coordinate system by rotating the tentative coordinate system about the first axis in accordance with the target angle and about the third axis in accordance with the advance angle; a position setting unit that sets a welding position of the tool on the basis of the newly set tool coordinate system; and a program creating unit.

9 Claims, 11 Drawing Sheets

(51) Int. Cl.
*G05B 19/4097* (2006.01)
*G05B 19/18* (2006.01)

(56) References Cited

U.S. PATENT DOCUMENTS

| | | | |
|---|---|---|---|
| 6,750,425 B2 | 6/2004 | Mukae et al. | |
| 2005/0049749 A1* | 3/2005 | Watanabe | B25J 9/1671 700/245 |
| 2005/0102066 A1* | 5/2005 | Watanabe | B25J 9/1656 700/264 |
| 2006/0152533 A1 | 7/2006 | Read | |
| 2013/0116822 A1 | 5/2013 | Atohira | |
| 2013/0325177 A1 | 12/2013 | Atohira | |
| 2015/0179855 A1* | 6/2015 | Huang | G02B 19/0042 136/246 |
| 2016/0096269 A1* | 4/2016 | Atohira | B25J 9/1687 700/264 |
| 2016/0151913 A1 | 6/2016 | Nagatsuka | |
| 2017/0235301 A1 | 8/2017 | Atohira | |
| 2018/0036882 A1* | 2/2018 | Kimura | B25J 9/1664 |
| 2018/0036883 A1* | 2/2018 | Nishitani | B25J 9/1671 |

FOREIGN PATENT DOCUMENTS

| | | | |
|---|---|---|---|
| CN | 105643622 A | | 6/2016 |
| CN | 107081756 A | | 8/2017 |
| DE | 69936073 T2 | | 8/2007 |
| DE | 102012021374 A1 | | 5/2013 |
| DE | 102015012763 A1 | | 4/2016 |
| DE | 102017102260 A1 | | 8/2017 |
| EP | 0974884 A2 | | 1/2000 |
| EP | 1431854 A1 | | 6/2004 |
| EP | 1517208 A2 | | 3/2005 |
| JP | S63256281 A | | 10/1988 |
| JP | H04232512 A | | 8/1992 |
| JP | 07200042 A | * | 8/1995 |
| JP | H07200042 A | | 8/1995 |
| JP | H08123536 A | | 5/1996 |
| JP | H11011129 A | | 1/1998 |
| JP | H11347733 A | | 12/1999 |
| JP | 2000094131 A | | 4/2000 |
| JP | 2000094131 A | * | 4/2000 |
| JP | 2001312305 A | | 11/2001 |
| JP | 2004001226 A | | 1/2004 |
| JP | 2004188594 A | | 7/2004 |
| JP | 2005316906 A | | 11/2005 |
| JP | 2012200814 A | | 10/2012 |
| JP | 2016074063 A | | 5/2016 |
| JP | 2017140684 A | | 8/2017 |

OTHER PUBLICATIONS

Search Report by Registered Search Organization received with Decision to Grant a Patent dated Jul. 2, 2019, for Japanese Patent Application No. 2017-174476.
Chinese Office Action dated Oct. 9, 2019, for Chinese Patent Application No. 201811047191.1.
German Office Action dated Mar. 25, 2020, for German Patent Application No. 10 2018 215 115.6.

* cited by examiner

PROGRAMMING DEVICE FOR WELDING ROBOT AND PROGRAMMING METHOD FOR WELDING ROBOT

CROSS-REFERENCE TO RELATED APPLICATIONS

This application is based on and relies for priority on Japanese Patent Application No. 2017-174476, filed on Sep. 12, 2017, the entire contents of which are incorporated herein by reference.

FIELD OF THE INVENTION

The present invention relates to programming devices for welding robots and programming methods for welding robots.

BACKGROUND OF THE INVENTION

In a welding robot, the welding position of a tool that welds two parts together is set so that the tool will not interfere with the parts or a peripheral device, etc. In a known type of technology, a user sets a target angle and an advance angle representing a desired welding position of a tool, and then angles that are the same as or close to the target angle and advance angle desired by the user are automatically set within a range where interference does not occur between parts and a welding robot, etc. by using shape data or the like of the parts, the welding robot, etc., whereby a welding position of the tool is provided (e.g., see Japanese Unexamined Patent Application, Publication No. 2000-94131).

SUMMARY OF THE INVENTION

The present invention provides the following solutions.

The present invention, in one aspect thereof, provides a programming device for a welding robot, the programming device including a model obtaining unit that obtains a three-dimensional model of the welding robot and three-dimensional models of two workpieces to be welded together by a tool of the welding robot; a welding-line specifying unit that specifies a welding line along which the two workpieces are to be welded together, as well as an origin on the welding line, on the basis of the three-dimensional models of the two workpieces; an accepting unit that accepts an operation; a target-angle setting unit that calculates an angle made at the origin by the two workpieces to be welded together as an angle projected onto a plane perpendicular to the welding line and sets a target angle of the tool by using the calculated angle or that sets the target angle on the basis of the operation accepted via the accepting unit; an advance-angle setting unit that sets an advance angle of the tool on the basis of the operation accepted via the accepting unit; a coordinate-system setting unit that sets a tentative coordinate system defined with reference to the origin and a tool coordinate system in accordance with the tool on the basis of the tentative coordinate system; a position setting unit that sets a welding position of the tool on the basis of the newly set tool coordinate system; and a program creating unit that creates an operating program for the welding robot to weld the two workpieces together with reference to the newly set tool coordinate system, wherein three axes constituting the tentative coordinate system include a first axis set on the basis of the welding line, a second axis perpendicular to the first axis and parallel to a face of one of the workpieces to be welded together, and a third axis perpendicular to both the first axis and the second axis, and the tool coordinate system is a coordinate system set by rotating the tentative coordinate system about the first axis of the tentative coordinate in accordance with the target angle and about the third axis of the tentative coordinate in accordance with the advance angle.

The present invention, in another aspect thereof, provides a programming method for a welding robot, the programming method including a step of obtaining a three-dimensional model of the welding robot and three-dimensional models of two workpieces to be welded together by a tool of the welding robot; a step of specifying a welding line along which the two workpieces are to be welded together, as well as an origin on the welding line, on the basis of the three-dimensional models of the two workpieces; a step of accepting an operation; a step of calculating an angle made at the origin by the two workpieces to be welded together as an angle projected onto a plane perpendicular to the welding line and setting a target angle of the tool by using the calculated angle or of setting the target angle on the basis of the accepted operation; a step of setting an advance angle of the tool on the basis of the accepted operation; a step of setting a tentative coordinate system defined with reference to the origin and a tool coordinate system in accordance with the tool on the basis of the tentative coordinate system; a step of setting a welding position of the tool on the basis of the newly set tool coordinate system; and a step of creating an operating program for the welding robot to weld the two workpieces together with reference to the newly set tool coordinate system, wherein three axes constituting the tentative coordinate system include a first axis set on the basis of the welding line, a second axis perpendicular to the first axis and parallel to a face of one of the workpieces to be welded together, and a third axis perpendicular to both the first axis and the second axis, and the tool coordinate system is a coordinate system set by rotating the tentative coordinate system about the first axis of the tentative coordinate in accordance with the target angle and about the third axis of the tentative coordinate in accordance with the advance angle.

DESCRIPTION OF EMBODIMENT(S) OF THE INVENTION

A control device (programming device) 2 for a welding robot 5 according to an embodiment of the present invention will be described below with reference to the drawings.

Figure 1:
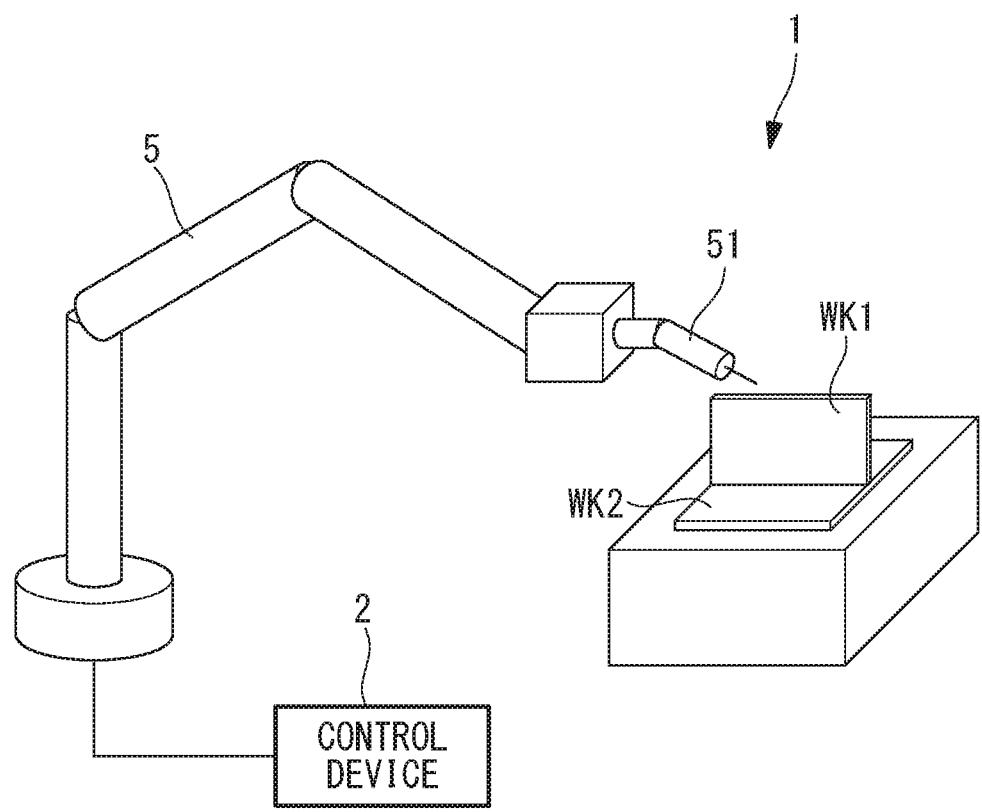
FIG. 1 is a schematic illustration showing a welding system including a control device for a welding robot according to an embodiment of the present invention.

FIG. 1 is a schematic illustration showing a welding system 1 including the control device 2 for the welding robot 5 according to this embodiment. The welding system 1 includes the welding robot 5, which is a vertical articulated robot having a plurality of joint shafts, and the control device 2, which controls the operation of the welding robot 5. Furthermore, FIG. 1 shows two workpieces WK1 and WK2 that are welded together by the welding robot 5.

The welding robot 5 is fixed on a floor, and a tool 51 for welding workpieces is attached to the distal end of the welding robot 5. The tool 51 has a columnar welding torch. Each of the plurality of joint shafts of the welding robot 5 includes a motor (not shown) for rotational driving and an encoder (not shown) that detects the rotation angle of the motor.

The control device 2 executes feedback control to rotationally drive the motors by using the rotation angles of the motors as detected by the encoders of the individual shafts of the welding robot 5. The control device 2 includes a CPU, a ROM, a RAM, and a memory, which are not shown.

Figure 2:
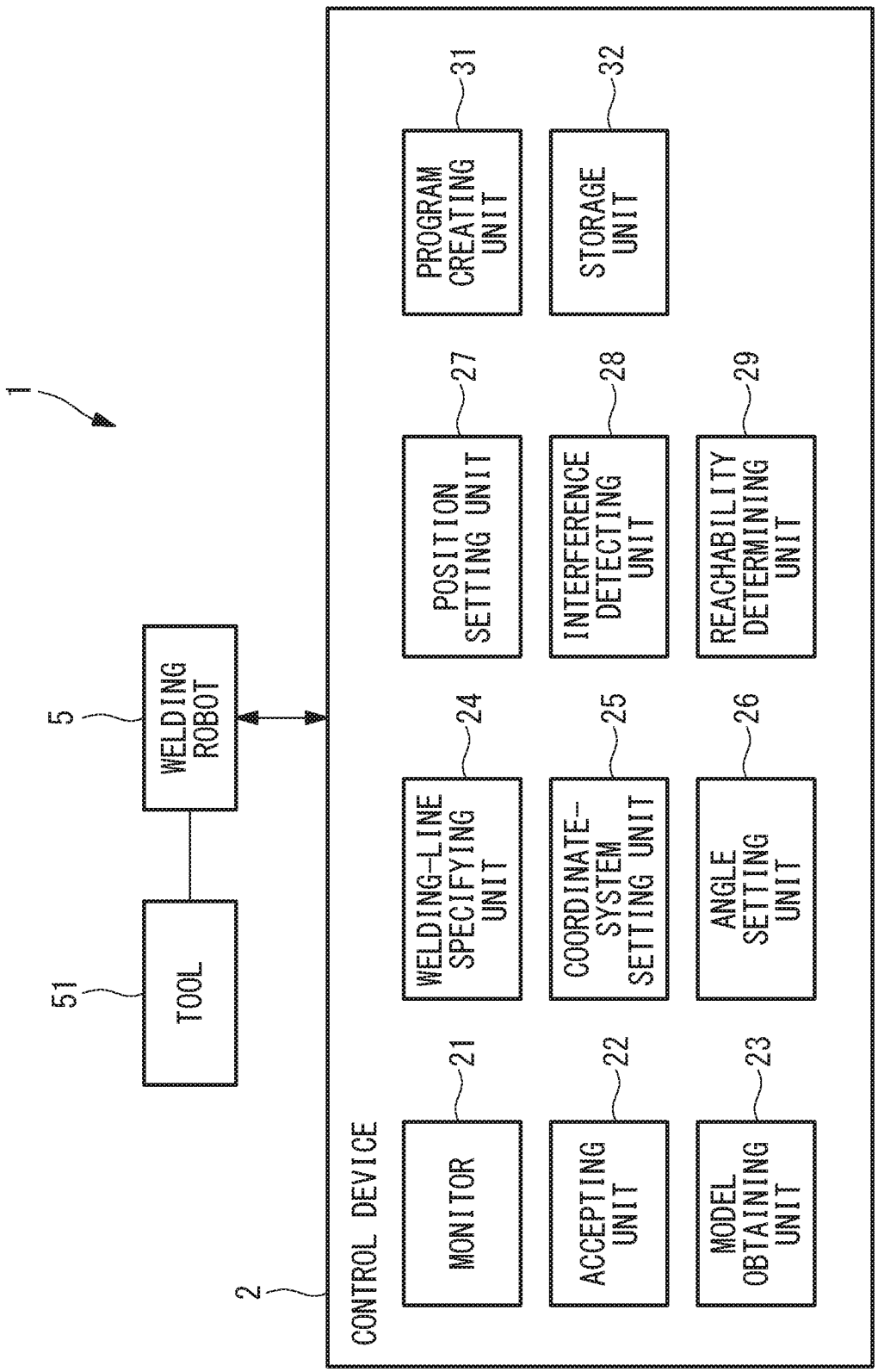
FIG. 2 is a block diagram of the welding system according to the embodiment.

FIG. 2 shows a block diagram of the welding system 1. The control device 2 includes a monitor 21 that displays various images, an accepting unit 22 that accepts operations by a user, a model obtaining unit 23 that obtains a three-dimensional model of the tool 51 and three-dimensional models of the workpieces WK1 and WK2, a welding-line specifying unit 24 that specifies a welding line along which the two workpieces WK1 and WK2 are welded together, a coordinate-system setting unit 25 that sets a tentative coordinate system on the basis of the angles made by the specified welding line and the two workpieces WK1 and WK2, an angle-setting unit (target-angle setting unit and advance-angle setting unit) 26 that sets a target angle and an advance angle of the tool 51 on the basis of an accepted input and/or a preset calculation method, a position setting unit 27 that sets a welding position of the tool 51 at the time of welding on the basis of the setting made by the angle setting unit 26, an interference detecting unit 28 that detects the presence or absence of interference between the tool 51, the workpieces WK1 and WK2, etc. at the time of welding by using the three-dimensional models thereof, a reachability determining unit 29 that determines welding reachability to all the points on the specified welding line by using the three-dimensional models, a program creating unit 31 for creating a program for controlling the welding robot 5 on the basis of the settings, and a storage unit 32 that stores the tentative coordinate system, the welding position of the tool 51, etc. that have been set.

The model obtaining unit 23 obtains CAD data representing three-dimensional models of the welding robot 5, the workpieces WK1 and WK2, and a peripheral device disposed in the periphery of the welding robot 5 and the workpieces WK1 and WK2. The model obtaining unit 23 is configured to dispose, by using the CAD data obtained, the three-dimensional models of the welding robot 5, etc. at the time of welding of the workpieces WK1 and WK2 in a virtual space. In this embodiment, the virtual space in which the three-dimensional models are disposed is displayed on the monitor 21.

Figure 3:
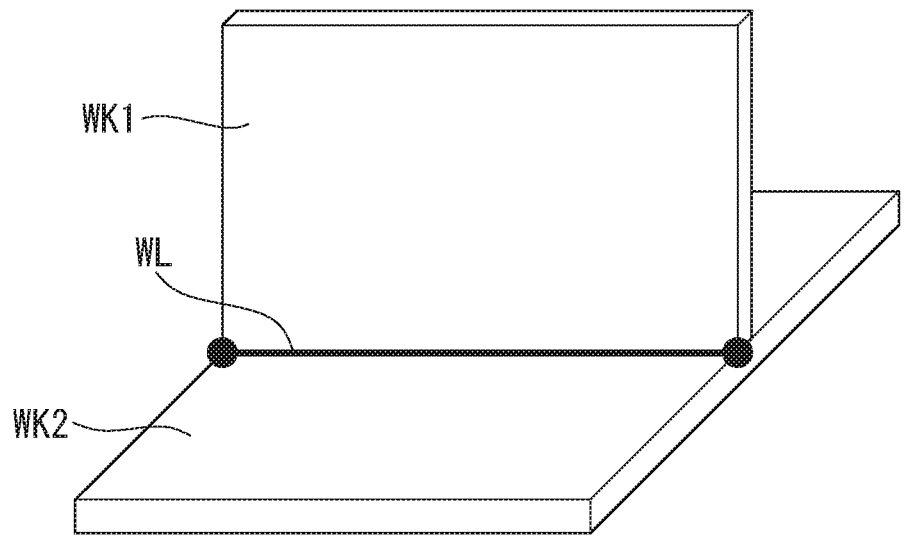
FIG. 3 is a schematic illustration showing the positional relationship between workpieces disposed in a virtual space.
Figure 4:
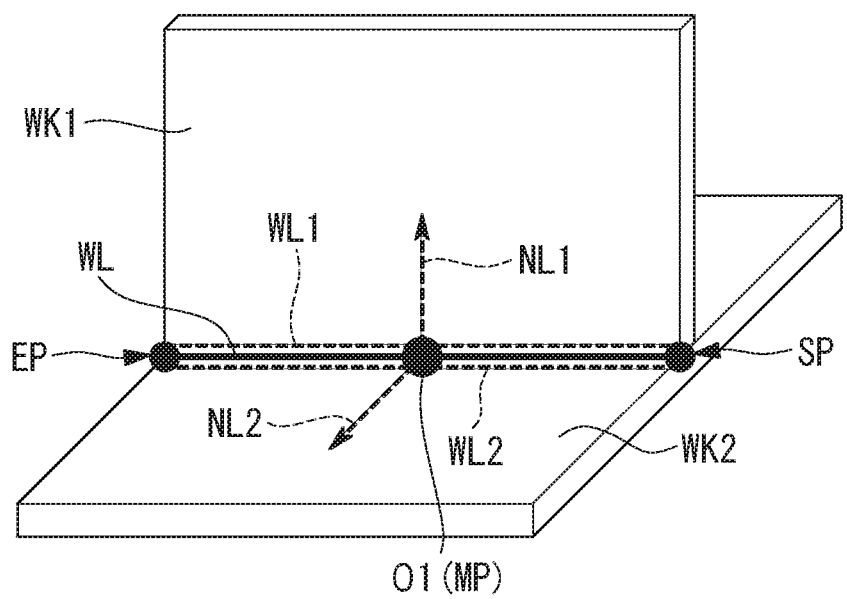
FIG. 4 is an illustration showing first and second welding lines and first and second normal lines that are set on the basis of a welding line.

As shown in FIG. 3, in this embodiment, a workpiece WK2 having a flat plate shape and disposed perpendicularly to a workpiece WK1 is welded to the workpiece WK1, which has a flat plate shape and is disposed in a horizontal orientation. The welding-line specifying unit 24 specifies, as a welding line WL, a portion at which the workpieces WK1 and WK2 disposed in the virtual space contact each other. Furthermore, as shown in FIG. 4, the welding-line specifying unit 24 specifies, as an origin O1, the midpoint MP between the start point SP and the end point EP of the welding line WL.

The coordinate-system setting unit 25 is configured to set a tentative coordinate system with reference to the specified origin O1. The coordinate-system setting unit 25 extracts a first welding line WL1 defined on the surface of the workpiece WK1 and a second welding line WL2 defined on the surface of the workpiece WK2 on the basis of the welding line WL specified in the virtual space. Note that although the welding line WL, the first welding line WL1, and the second welding line WL2 are substantially the same straight lines, for convenience the welding line WL is indicated by a solid line, and the first welding line WL1 and the second welding line WL2 are indicated by broken lines in FIG. 4 such that these lines do not overlap each other. The coordinate-system setting unit 25 sets a first normal line NL1 that passes through the origin O1, that is perpendicular to the first welding line WL1 on the surface of the workpiece WK1, and that is parallel to the surface of the workpiece WK1, and a second normal line NL2 that passes through the origin O1, that is perpendicular to the second welding line WL2 on the surface of the workpiece WK2, and that is parallel to the surface of the workpiece WK2.

The coordinate setting unit 25 selects one of the workpieces WK1 and sets a tentative coordinate system in which the first welding line WL1 and the first normal line NL1 for the selected workpiece WK1 serve as axes. Alternatively, the workpiece WK2 may be selected instead of the workpiece WK1.

Figure 5:
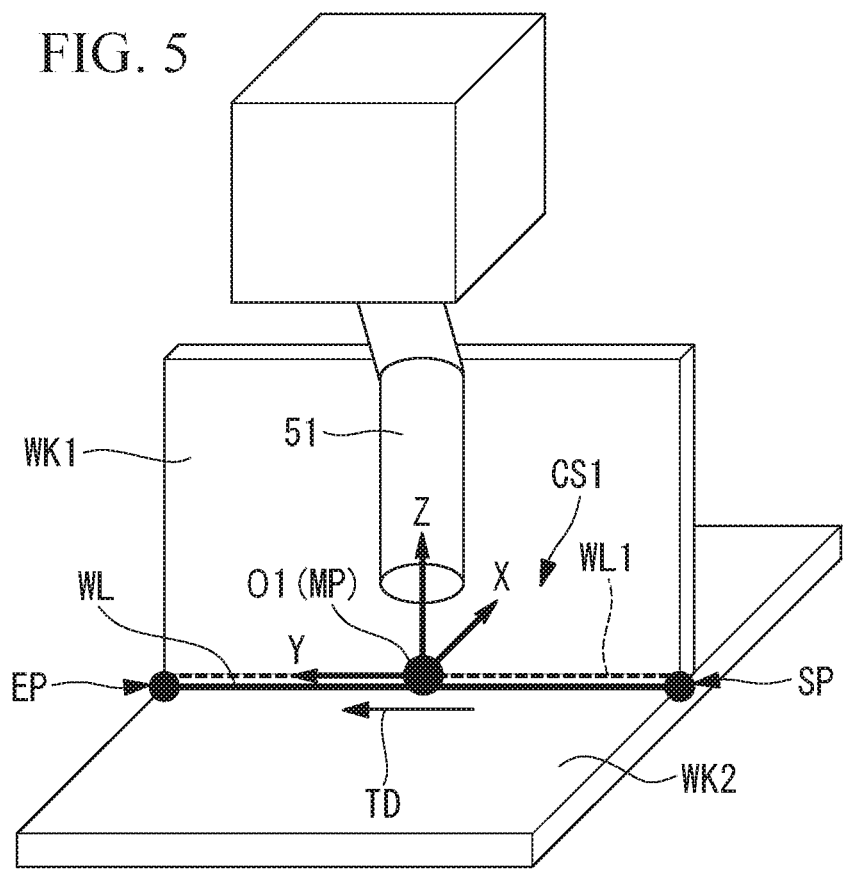
FIG. 5 is an illustration showing a tentative coordinate system that is set on the basis of the welding line.

The coordinate-system setting unit 25 is configured to define, as three axes constituting a tentative coordinate system CS1, a Y axis (first axis) that is parallel to the first welding line WL1 and with which the advancing direction of the tool 51 at the time of welding (the direction of an arrow TD) is considered as positive, a Z axis (second axis) that is parallel to the first normal line NL1 and with which the vertically upward direction is considered as positive, and an X axis (third axis) that is perpendicular to both the Y axis and the Z axis, as shown in FIG. 5. As for the X axis, the direction penetrating the workpiece WK1 in the thickness direction from the origin O1 is defined as the positive direction.

Figure 6:
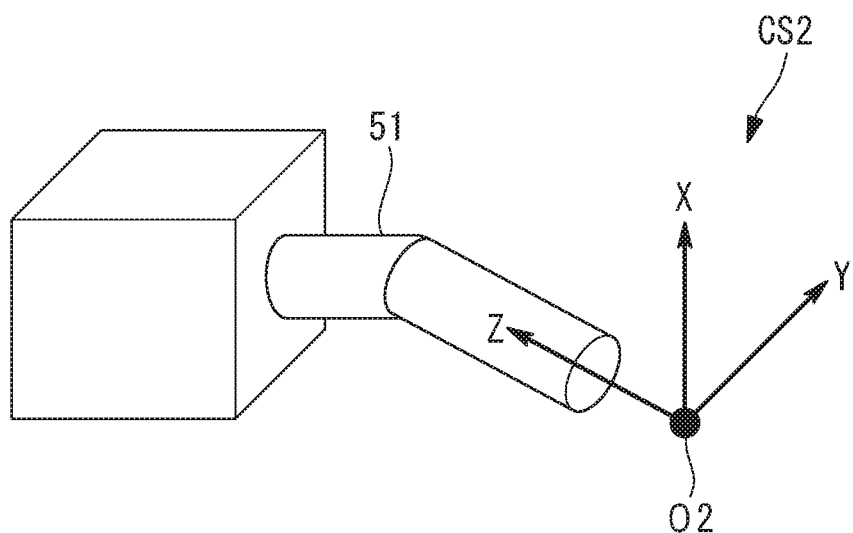
FIG. 6 is an illustration showing a tool coordinate system that is set for a tool.

FIG. 6 shows a tool coordinate system CS2 that is preset for the tool 51 of the welding robot 5. In the tool coordinate system CS2, the distal end of the tool 51 is defined as an origin O2, and the lengthwise direction of the tool 51 is defined as a Z axis.

The position setting unit 27 is configured to set a welding position of the tool 51 such that the origin O2 of the tool coordinate system CS2 coincides with the origin O1 of the tentative coordinate system CS1 and such that the X, Y, and Z axes of the tool coordinate system CS2 respectively coincide with the X, Y, and Z axes of the tentative coordinate system CS1.

Figure 7:
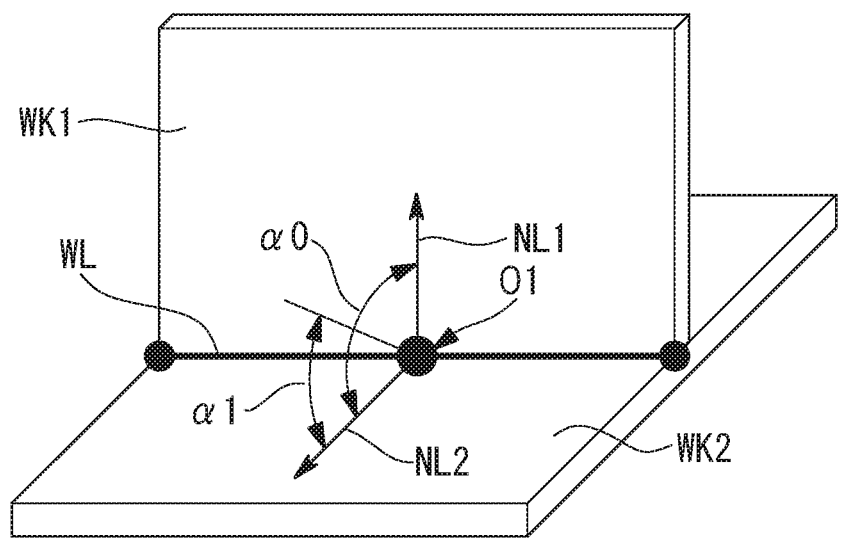
FIG. 7 is an illustration showing a target angle that is set for the tool at the time of welding.
Figure 8:
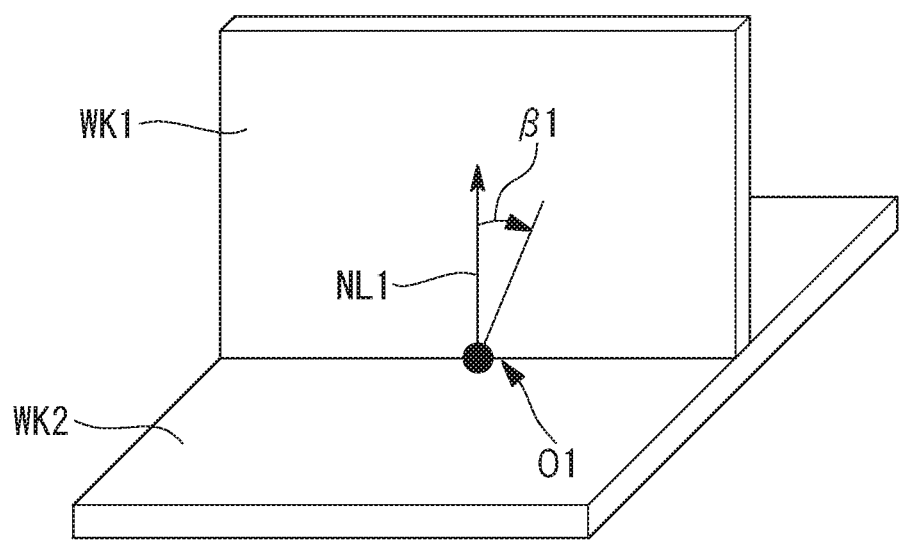
FIG. 8 is an illustration showing an advance angle that is set for the tool at the time of welding.

The angle setting unit 26 is configured to calculate an angle α0 made by the first normal line NL1 and the second normal line NL2 as an angle made by the workpiece WK1 and the workpiece WK2 contacting each other via the welding line WL at the origin O1, as shown in FIG. 7. In this embodiment, the angle setting unit 26 sets an angle that is one half of the calculated angle α0 made by the first normal line NL1 and the second normal line NL2 as a target angle α1 of the tool 51 at the time of welding. Furthermore, the angle setting unit 26 sets an advance angle β1 of the tool 51 at the time of welding on the basis of a user input accepted via the accepting unit 22, as shown in FIG. 8.

The position setting unit 27 rotates the tool coordinate system CS2 about the Y axis of the tentative coordinate system CS1 so as to attain the set target angle α1. Furthermore, the position setting unit 27 rotates the tool coordinate system CS2 about the X axis of the tentative coordinate system CS1 so as to attain the set advance angle β1. Thus, the orientation of the tool coordinate system CS2 for the welding position of the welding robot 5 is determined, and the angles of the individual shafts of the welding robot 5 for attaining the determined tool coordinate system CS2 are calculated.

The program creating unit 31 is configured to generate teaching points for the welding robot 5 by using the calculated angles of the individual shafts of the welding robot 5, thereby creating a welding program.

Figure 9:
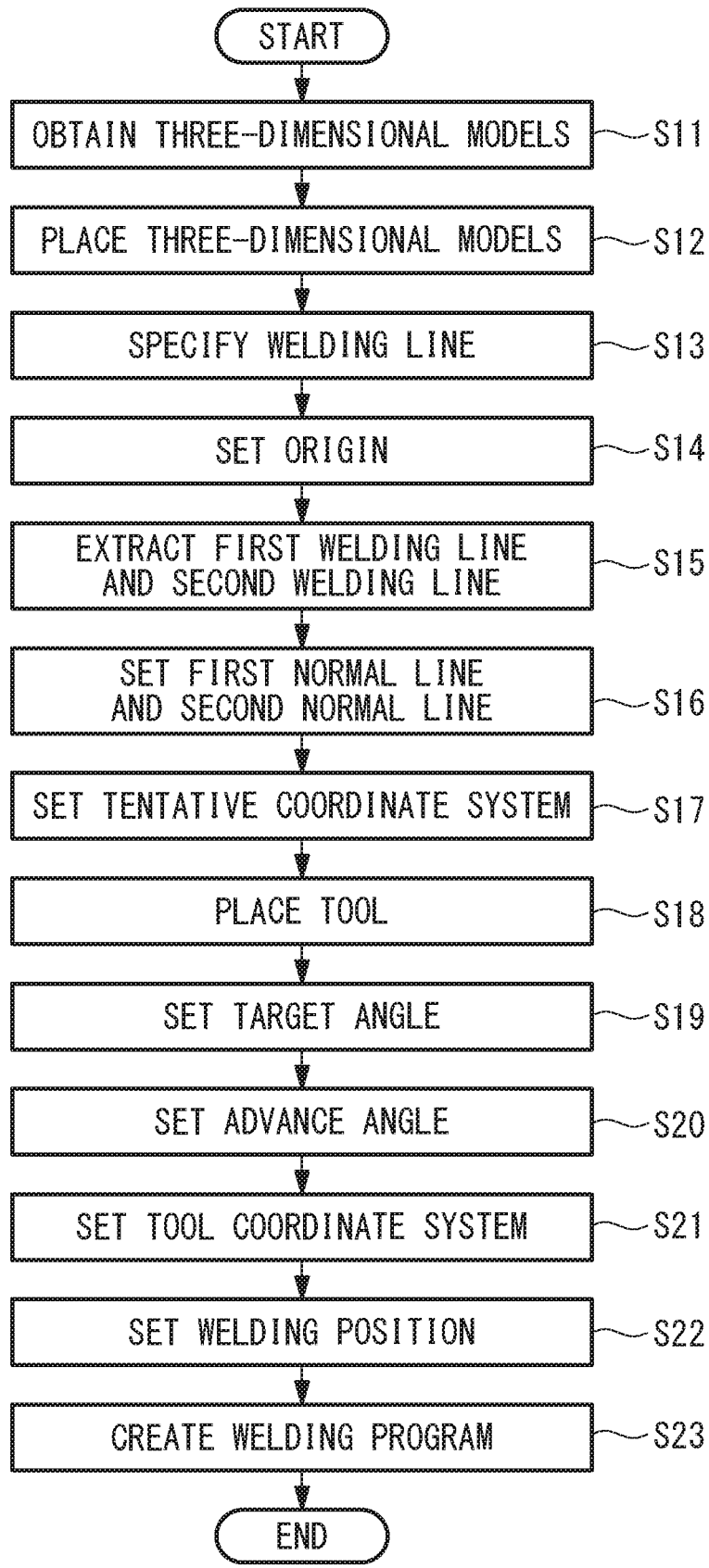
FIG. 9 is a flowchart of a programming method for the welding robot.

The following describes an example of specific processing from obtaining three-dimensional models of the tool 51, etc. to creating a welding program for the welding robot 5, with reference to a flowchart of a programming method for the welding robot 5 shown in FIG. 9. In the programming method for the welding robot 5, first, the model obtaining unit 23 obtains CAD data of the three-dimensional model of the welding robot 5 and the three-dimensional models of the workpieces WK1 and WK2 (step S11). Then, the model obtaining unit 23 disposes the welding robot 5 and the workpieces WK1 and WK2 in a virtual space by using the three-dimensional models obtained (step S12).

The welding-line specifying unit 24 specifies, as a welding line WL, a portion at which the workpiece WK1 and the workpiece WK2 disposed in the virtual space contact each other (step S13). Then, the welding-line specifying unit 24 sets the midpoint MP of the specified welding line WL as the origin O1 of a tentative coordinate system CS1 (step S14). The coordinate-system setting unit 25 extracts a first welding line WL1 on the workpiece WK1 and a second welding line WL2 on the workpiece WK2 on the basis of the specified welding line WL (step S15). Then, the coordinate-system setting unit 25 sets a first normal line NL1 and a second normal line NL2 by using the first welding line WL1 and the second welding line WL2 (step S16).

The coordinate-system setting unit 25 sets a tentative coordinate system CS1 with reference to the origin O1 (step S17). Specifically, the coordinate-system setting unit 25 selects the workpiece WK1 and sets a Y axis that passes through the origin O1, that is parallel to the first welding line WL1 on the selected workpiece WK1, and with which the advancing direction of the tool 51 at the time of welding is considered as positive. Furthermore, the coordinate-system setting unit 25 sets a Z axis that passes through the origin O1, that is parallel to the first normal line NL1 perpendicular to the first welding line WL1, and with which the upward direction is considered as positive. Furthermore, the coordinate-system setting unit 25 sets an X axis that passes through the origin O1 and that is perpendicular to both the Y axis and the Z axis. The coordinate-system setting unit 25 sets a tentative coordinate system CS1 having the X axis, the Y axis, and the Z axis as three axes thereof.

The position setting unit 27 disposes the three-dimensional model of the tool 51 in the virtual space such that a tool coordinate system CS2 set for the tool 51 coincides with the set tentative coordinate system CS1 (step S18).

The angle setting unit 26 calculates an angle α0 made by the first normal line NL1 and the second normal line NL2 and sets a target angle α1 of the tool 51, which is one half of the calculated angle (step S19). Then, the angle setting unit 26 sets an advance angle β1 of the tool 51 on the basis of an operation accepted via the accepting unit 22 (step S20).

Figure 10:
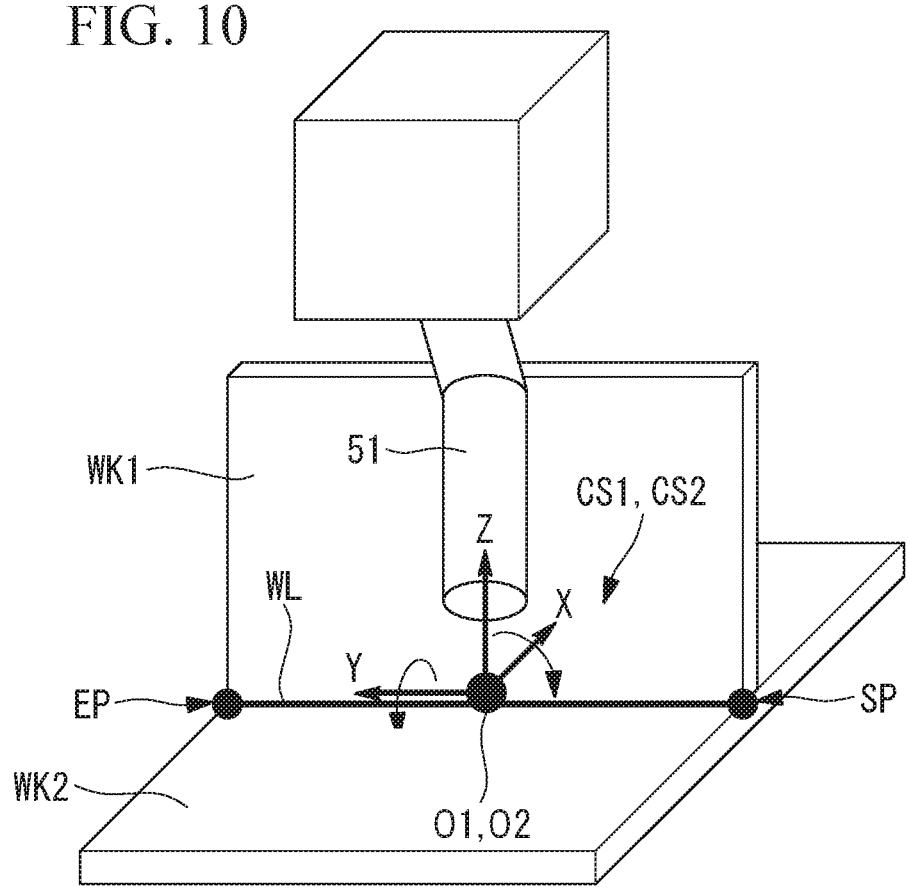
FIG. 10 is an illustration showing a tentative coordinate system before being rotated about an X axis and/or a Y axis.
Figure 11:
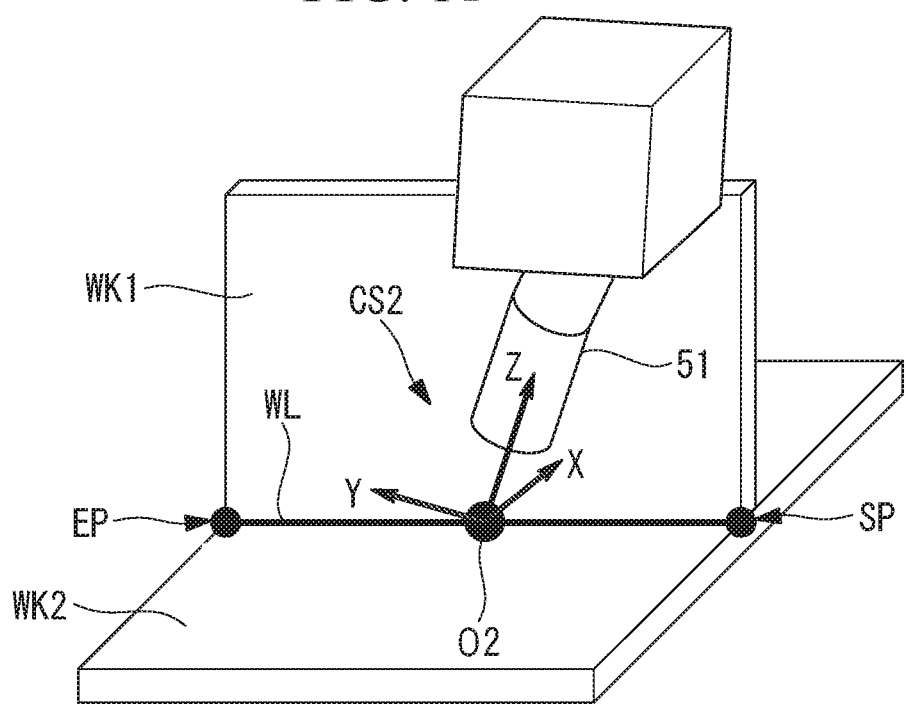
FIG. 11 is an illustration showing a tool coordinate system that is set by rotating the tentative coordinate system about the X axis and/or the Y axis.

The coordinate-system setting unit 25 rotates the tool coordinate system CS2 that has been set so as to coincide with the tentative coordinate system CS1 about the X axis and Y axis of the tentative coordinate system CS1 by using the set target angle α1 and advance angle β1, as shown in FIG. 10, thereby setting a tool coordinate system CS2 shown in FIG. 11 (step S21). Specifically, the coordinate-system setting unit 25 rotates the tool coordinate system CS2 by the set target angle α1 about the Y axis of the tentative coordinate system CS1. Furthermore, the coordinate-system setting unit 25 rotates the rotated tool coordinate system CS2 by the advance angle β1 about the X axis of the tentative coordinate system CS1. The coordinate-system setting unit 25 sets a tool-coordinate system CS2 that coincides with the rotated coordinate system.

The position setting unit 27 sets, as a welding position of the tool 51 at the time of welding, a position of the tool 51 with which the Z axis of the set tool coordinate system CS2 coincides with the lengthwise direction of the tool 51 (step S22).

The program creating unit 31 generates teaching points for the welding robot 5 by using the calculated angles of the individual shafts of the welding robot 5 in the set tool coordinate system S2 whose Z axis coincides with the lengthwise direction of the tool 51, thereby creating a welding program (step S23). Then, the programming method for the welding robot 5 is terminated.

With the thus-configured control device 2 for the welding robot 5 according to this embodiment, a tentative coordinate system CS1 having a Y axis that is parallel to a specified welding line WL between a workpiece WK1 and a workpiece WK2, a Z axis that is perpendicular to the Y axis and that is parallel to the workpiece WK1, and an X axis that is perpendicular to both the Y axis and the Z axis as three axes thereof is set, and a tool coordinate system CS2 that coincides with the tentative coordinate system CS1 is set. Then, the set tool coordinate system CS2 coinciding with the tentative coordinate system CS1 is rotated about the X axis and the Y axis on the basis of a set target angle and a set advance angle, and the rotated coordinate system is set as a tool coordinate system CS2. Even if the welding position of the tool 51 changes, the set tool coordinate system CS2 changes such that the lengthwise direction of the tool 51 coincides with the Z axis thereof. An operation program for welding the workpiece WK1 and the workpiece WK2 together is created with reference to the tool coordinate system CS2.

Accordingly, with the control device 2 according to this embodiment, the tool coordinate system CS2 is set on the basis of the target angle α1 and the advance angle β1 with reference to the welding line WL. Thus, in the case where the welding position of the tool 51 is changed, the user of the welding robot 5 can change the welding position of the tool 51 with reference to the lengthwise direction of the tool 51, which coincides with the Z axis of the tool coordinate system CS2. Accordingly, in the case where the user wishes to change the position of the tool 51 after the target angle α1 and the advance angle β1 are set once and the welding position of the tool 51 is set, the user can change the position of the tool 51 with reference to the welding position of the tool 51 at that time, which makes it easy to adjust the welding position of the tool 51.

Figure 12:
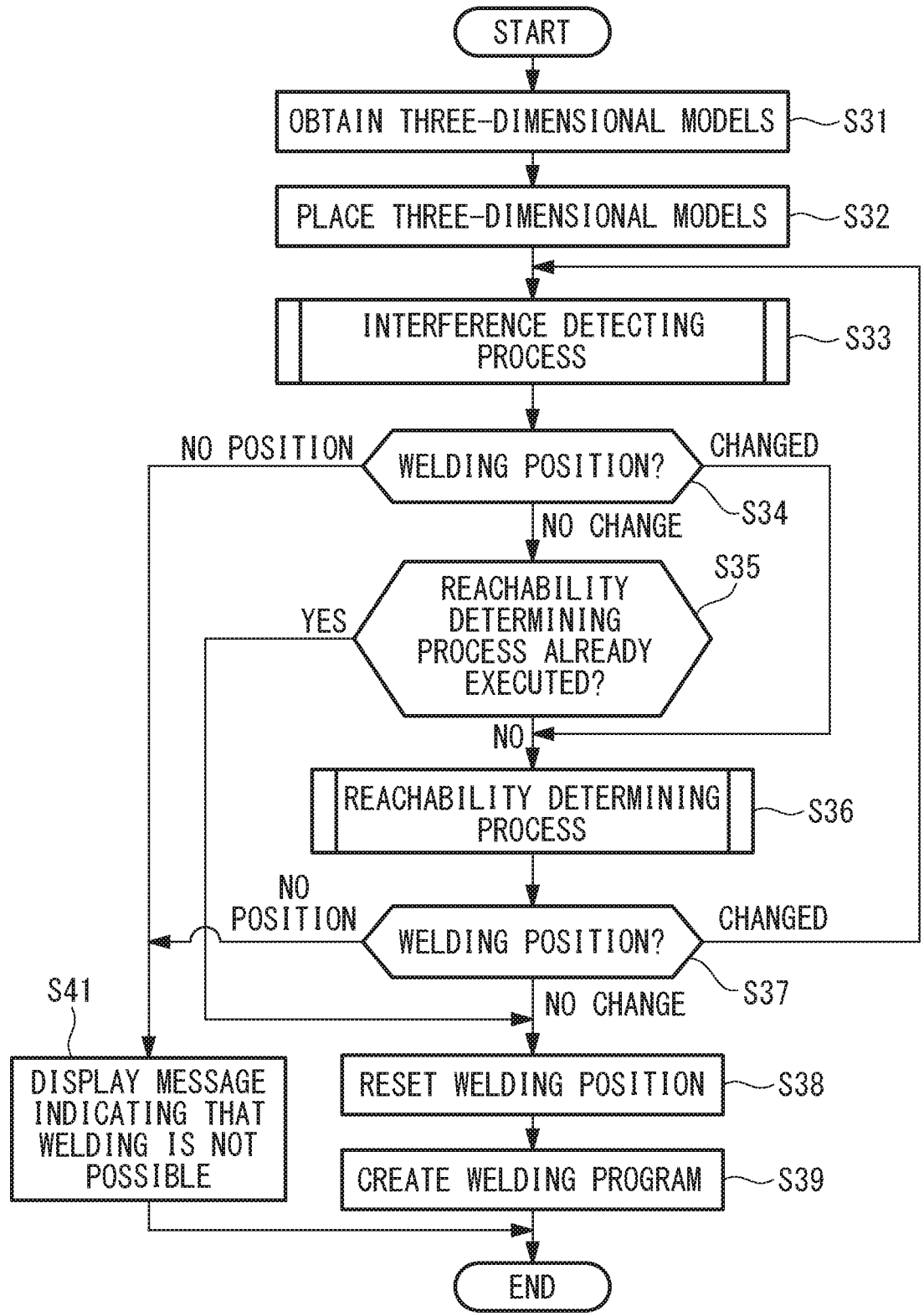
FIG. 12 is a flowchart of a welding-position resetting process.

FIG. 12 shows a flowchart of a welding position resetting process for the case where the welding position of the tool 51, set by the programming method (FIG. 9) for the welding robot 5, is reset. In the welding position resetting process, interference between the tool 51 and a peripheral device, etc. and reachability of the tool 51 to all the points on the welding line WL in the case where welding is performed along the welding line WL with the set welding position of the tool 51 are considered, and then the welding position of the tool 51 is reset.

In the welding position resetting process, first, the model obtaining unit 23 obtains CAD data representing a three-dimensional model of a peripheral device disposed in the periphery of the tool 51 in addition to the already obtained CAD data representing three-dimensional models of the tool 51 and the workpieces WK1 and WK2 (step S31). Then, the model obtaining unit 23 disposes the three-dimensional models of the tool 51, the workpieces WK1 and WK2, and the peripheral device in the virtual space (step S32).

The interference detecting unit 28 executes, in the virtual space, an interference detecting process for detecting interference that will occur between the tool 51 and the peripheral device or the workpieces WK1 and WK2 in the case where welding is performed along the welding line WL with the welding position of the tool 51 set by the position setting unit 27 (step S33). In the interference detecting process, interference that will occur between the tool 51 and the workpieces WK1 and WK2 or the peripheral device in the case where welding is performed from the start point SP to the end point EP of the welding line WL with the set welding position of the tool 51 is detected.

Figure 13:
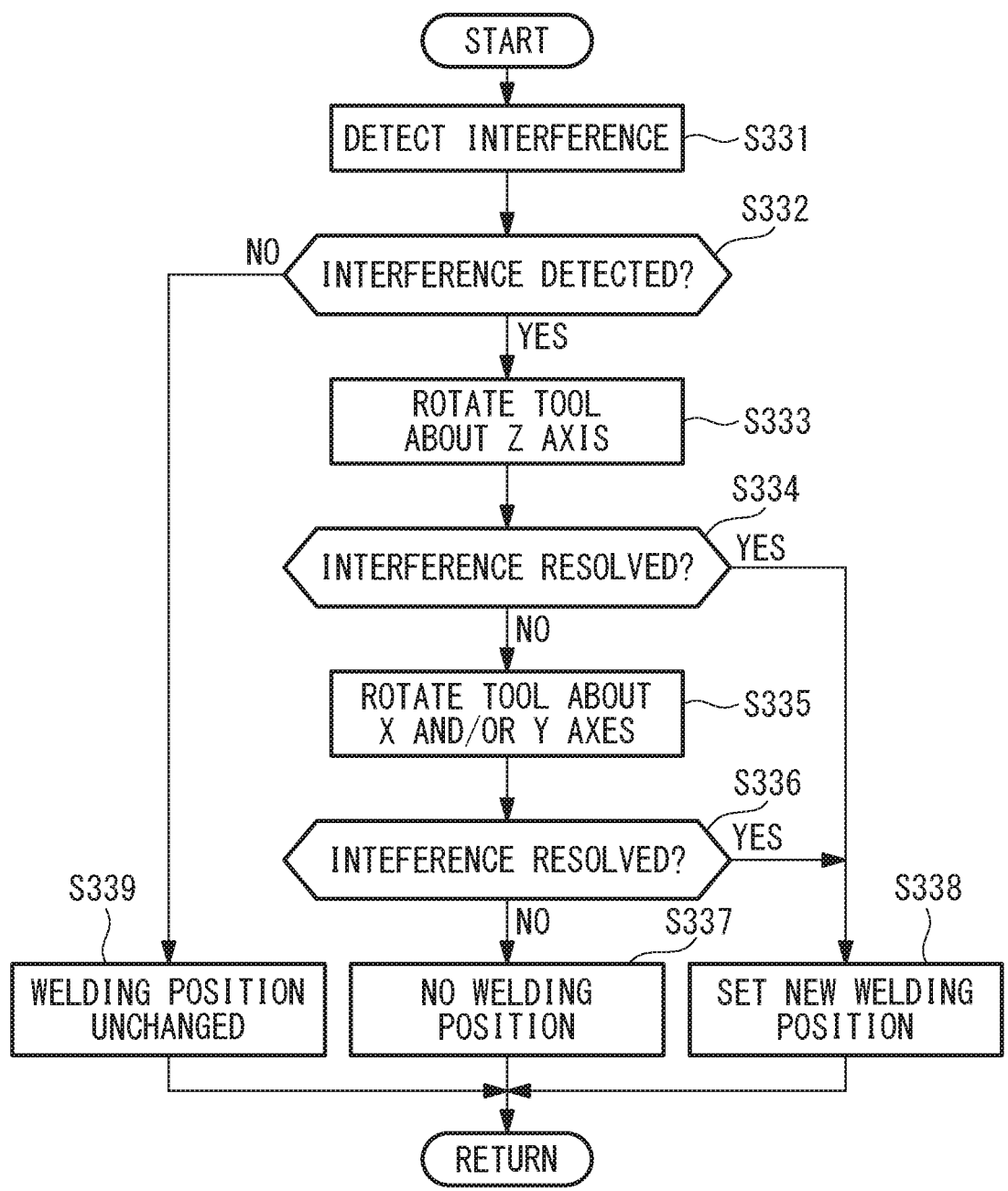
FIG. 13 is a flowchart of an interference detecting process.

In the interference detecting process shown in FIG. 13, first, the interference detecting unit 28 detects, in the virtual space, interference that will occur between the tool 51 and the workpieces WK1 and WK2 or the peripheral device in the case where the workpiece WK1 and the workpiece WK2 are welded together along the welding line WL (step S331). Specifically, the interference detecting unit 28 detects interference by moving the tool 51 along the welding line WL with the set welding position of the tool 51 in the virtual space.

In the case where interference between the tool 51 and the peripheral device, etc. is not detected (step S332: NO), the position setting unit 27 does not change the already set welding position of the tool 51, and the already set welding position is stored in the storage unit 32, considering that the welding position of the tool 51 is not changed in the interference detecting process (step S339). Then, the interference detecting process is terminated.

Figure 14:
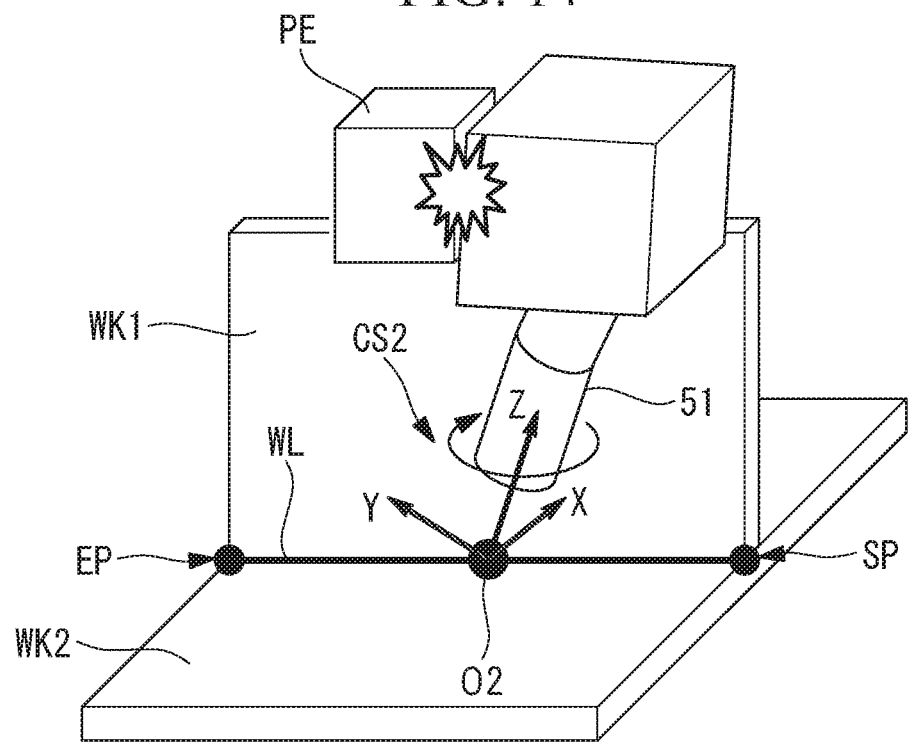
FIG. 14 is an imaginary illustration showing a case where interference occurs between the tool and a peripheral device.

In the case where interference between the tool 51 and the peripheral device PE is detected in the virtual space in the processing in step S332 (step S332: YES), as shown in FIG. 14, the position setting unit 27 rotates the tool 51 about the Z axis (step S333) and determines whether or not the interference can be resolved (step S334). In order to set a welding position of the tool 51 with which interference does not occur between the tool 51 and the peripheral device PE, the position setting unit 27 rotates the tool 51 about the Z axis within a preset rotatable angle range. In this embodiment, in step S333, the position setting unit 27 rotates the tool 51 stepwise by a preset small angle to calculate an angle at which interference does not occur between the tool 51 and the peripheral device PE.

In the case where it is determined that interference between the tool 51 and the peripheral device PE can be resolved by rotating the tool 51 about the Z axis (step S334: YES), the position setting unit 27 stores the position of the tool 51 after resolving interference in the storage unit 32 as a new welding position of the tool 51 (step S338). Then, the interference detecting process is terminated.

In the case where it is determined in the processing in step S334 that interference between the tool 51 and the peripheral device PE cannot be resolved even if the tool 51 is rotated about the Z axis (step S334: NO), the position setting unit 27 rotates the tool 51 about the X axis and/or the Y axis in addition to the Z axis (step S335) and determines whether or not interference between the tool 51 and the peripheral device PE can be resolved (step S336). The method of rotation about the X axis and/or the Y axis is the same as the method of rotation about the Z axis in step S333.

Figure 15:
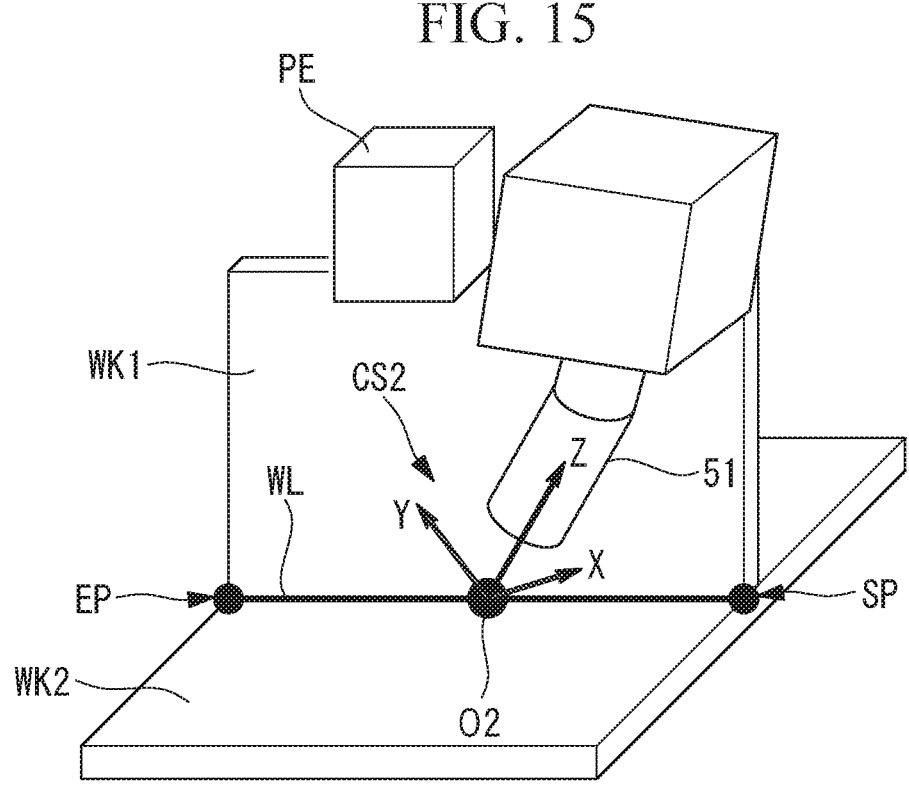
FIG. 15 is an imaginary illustration showing a case where the interference occurs between the tool and the peripheral device is resolved.

In the case where it is determined that interference between the tool 51 and the peripheral device PE can be resolved by rotating the tool 51 about the X axis and/or the Y axis in addition to the Z axis (step S336: YES), as shown in FIG. 15, the position setting unit 27 stores the position of the tool 51 in this case in the storage unit 32 as a new welding position of the tool 51 (step S338). Then, the interference detecting process is terminated.

In the case where it is determined that interference between the tool 51 and the peripheral device PE cannot be resolved even if the tool 51 is rotated about the X axis and/or the Y axis in addition to the Z axis (step S336: NO), the position setting unit 27 stores, in the storage unit 32, information indicating that there is no welding position of the tool 51 with which interference can be resolved (step S337). Then, the interference detecting process is terminated.

When the interference detecting process (FIG. 13) is terminated, the position setting unit 27 performs determination as to the welding position of the tool 51 stored in the storage unit 32 after the interference detecting process (step S34 in FIG. 12). In the case where information indicating that there is no welding position of the tool 51 is stored in the storage unit 32 (step S34: NO POSITION), it is not possible to perform welding along the set welding line WL, and thus a message indicating that it is necessary to reset the disposition of the workpieces WK1 and WK2 is displayed on the monitor 21 (step S41). Then, the programming method for the welding robot 5 is terminated.

In the case where it is determined in the processing in step S34 that the welding position of the tool 51 stored in the storage unit 32 is a new position different from that before the interference detecting process (step S34: CHANGED), a reachability determining process that will be described later is executed (step S36).

In the case where it is determined in the processing in step S34 that the welding position of the tool 51 stored in the storage unit 32 is a position that is unchanged before and after the interference detecting process (step S34: NO CHANGE), the position setting unit 27 determines whether or not the reachability determining process described later has already been executed at that time (step S35). In the case where it is determined that the reachability determining process has already been executed (step S35: YES), a welding position resetting process that will be described later is executed (step S38).

In the case where it is determined in the processing in step S35 that the reachability determining process has not yet been executed (step S35: NO), the reachability determining unit 29 executes a reachability determining process in the virtual space to determine whether or not the tool 51 can reach all the points on the welding line WL with the welding position of the tool 51 stored in the storage unit 32 (step S36).

Figure 16:
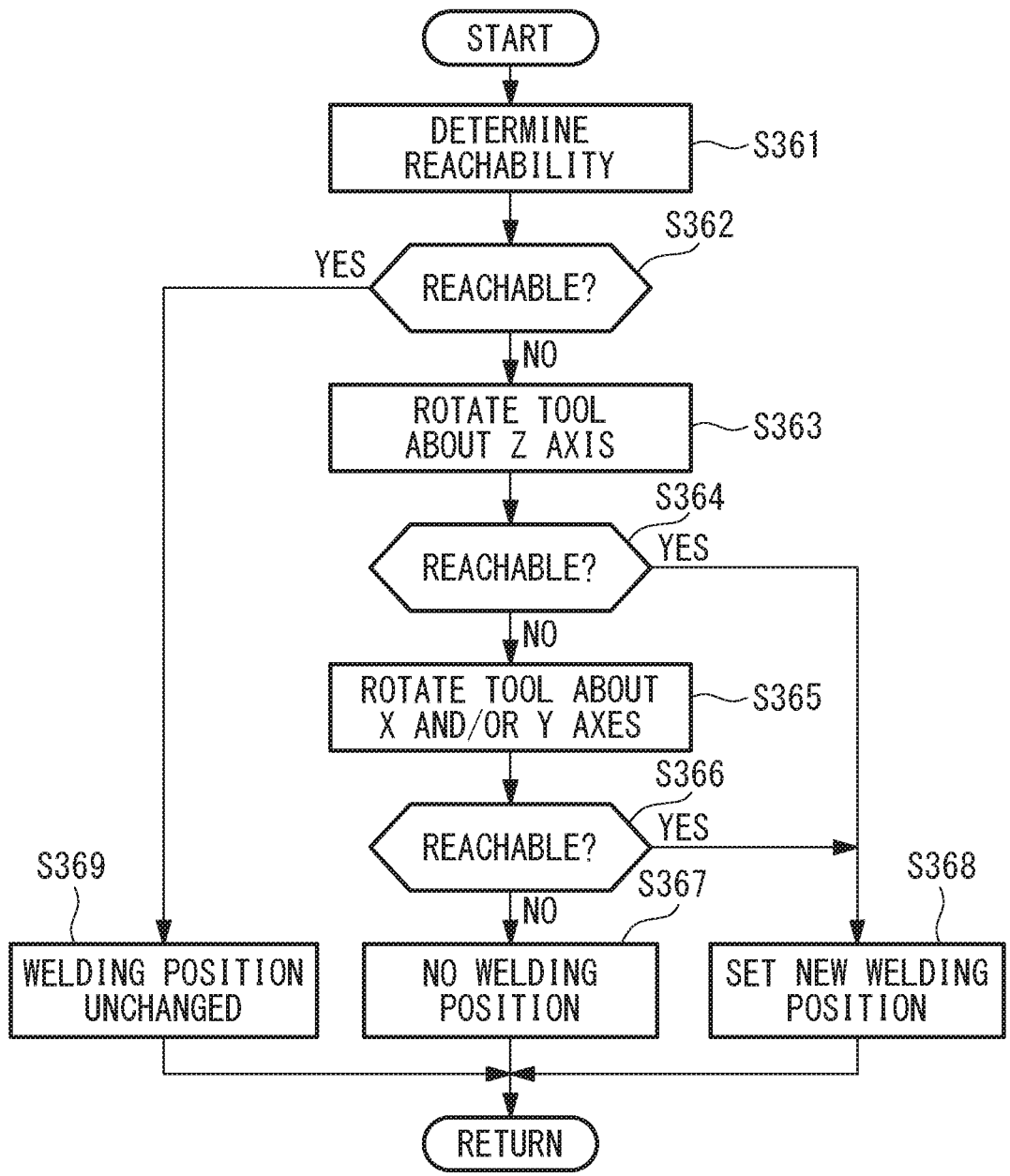
FIG. 16 is a flowchart of a reachability determining process.

In the reachability determining process shown in FIG. 16, first, the reachability determining unit 29 determines whether or not the tool 51 can reach from the start point SP to the end point EP of the welding line WL with the welding position of the tool 51 stored in the storage unit 32 after the interference detecting process (step S361). In the case where it is determined that the tool 51 can reach all the points on the welding line WL with the welding position of the tool 51 stored in the storage unit 32 (step S362: YES), the position setting unit 27 stores the welding position of the tool 51, without changing the position, in the storage unit 32 as a welding position of the tool 51 with which the tool 51 can reach all the points on the welding line WL (step S369). Then, the reachability determining process is terminated.

In the case where it is determined in the processing in step S362 that the tool 51 cannot reach all the points on the welding line WL with the set welding position of the tool 51 (step S362: NO), the position setting unit 27 rotates the tool 51 about the Z axis (step S363) and determines whether or not the tool 51 can reach all the points on the welding line WL (step S364). In order to set a welding position that enables the tool 51 to reach all the points on the welding line WL, the position setting unit 27 rotates the tool 51 about the Z axis within a preset rotatable angle range. The position setting unit 27 rotates the tool 51 about the Z axis stepwise by a preset small angle by the same method as the interference detecting process and calculates a welding position that enables the tool 51 to reach all the points on the welding line WL.

In the case where it is determined that the tool 51 can reach all the points on the welding line WL by rotating the tool 51 about the Z axis (step S364: YES), the position setting unit 27 stores the reachable position of the tool 51 in the storage unit 32 as a new welding position of the tool 51 (step S368). Then, the reachability determining process is terminated.

In the case where it is determined in the processing in step S364 that the tool 51 cannot reach all the points on the welding line WL even if the tool 51 is rotated about the Z axis (step S364: NO), the position setting unit 27 rotates the tool 51 about the X axis and/or the Y axis in addition to the Z axis (step S365) and determines whether or not the tool 51 can reach all the points on the welding line WL (step S366). The method of rotation about the X axis and/or the Y axis is the same as the method of rotation about the Z axis in step S363.

In the case where the tool 51 can reach all the points on the welding line WL by rotating the tool 51 about the X axis and/or the Y axis in addition to the Z axis (step S366: YES), the position setting unit 27 stores the position of the tool 51 in this case in the storage unit 32 as a new welding position of the tool 51 (step S368). Then, the reachability determining process is terminated.

In the case where it is determined that the tool 51 cannot reach all the points on the welding line WL even if the tool 51 is rotated about the X axis and/or the Y axis in addition to the Z axis (step S366: NO), the position setting unit 27 stores, in the storage unit 32, information indicating that there is no welding position that enables the tool 51 to reach all the points on the welding line WL (step S367). Then, the reachability determining process is terminated.

When the reachability determining process (FIG. 16) is terminated, the position setting unit 27 determines the welding position of the tool 51 stored in the storage unit 32 after the reachability determining process (step S37 in FIG. 12). In the case where information indicating that there is no welding position of the tool 51 is stored in the storage unit 32 (step S37: NO POSITION), the processing in step S41 is executed, and then the position resetting process is terminated.

In the case where it is determined in the processing in step S27 that the welding position of the tool 51 stored in the storage unit 32 is a new position different from that before the reachability determining process (step S37: CHANGED), the interference detecting process is executed again (step S33). That is, the interference detecting unit 28 executes the interference detecting process to check whether or not interference with the peripheral device PE, etc. occurs with the welding position of the tool 51 set after the reachability determining process.

In the case where it is determined in the processing in step S37 that the welding position of the tool 51 stored in the storage unit 32 is a position that is unchanged before and after the reachability determining process (step S37: NO CHANGE), the position setting unit 27 resets the welding position of the tool 51 set after the reachability determining process as a position at the time of welding (step S38).

The program creating unit 31 generates teaching points for the welding robot 5 by using the calculated angles of the individual shafts of the welding robot 5 in the tool coordinate system CS2 after the resetting, thereby creating a welding program (step S39). Then, the position resetting process is terminated.

As described above, the tool coordinate system CS2 and the welding position of the tool 51 may be reset through the interference detecting process and the reachability determining process.

With the control device 2 according to the above embodiment, in the case where interference is detected or it is determined that welding cannot be performed along a portion of the welding line WL in the interference detecting process or the reachability determining process, the tool 51 is rotated about the Z axis within a preset rotatable angle range. By preferentially rotating the tool 51 about the Z axis rather than the X axis and the Y axis in changing the welding position of the tool 51, the welding position of the tool 51 is reset while minimizing changes in the target angle $\alpha 1$ and the advance angle $\beta 1$. Furthermore, since the tool 51 is rotated about the Z axis within the preset rotatable angle range, in the case where another component, such as a cord, exists between the proximal end and the distal end of the tool 51, winding or other types of interference between the tool 51 and the other component can be prevented. In an alternative embodiment, it is not necessary to preset a rotatable angle range, and the tool 51 may be rotated about the X axis and the Y axis rather than being rotated preferentially about the Z axis.

Although the midpoint MP of the welding line WL is set as the origin O1 of the tentative coordinate system CS1 and the origin O2 of the tool coordinate system CS2 in the control device 2 according to the above embodiment, various modifications about the settings of the origins O1 and O2 are possible. For example, the origins O1 and O2 may be set at the start point SP or at a plurality of points such as the start point SP and the end point EP. In the case where a plurality of origins are set, the welding position of the tool 51 is set at each of the origins, and in the case where the tool 51 is moved along the welding line WL during welding, the welding position of the tool 51 may be gradually changed to the welding position set for each of the origins as the tool 51 approaches that origin.

Although the welding line WL is a straight line in the control device 2 according to the above embodiment, alternatively, the welding line WL may be a non-straight line, such as a curved line. For example, in the case where the origin O1 is set on a curved welding line WL, a line that is parallel to the tangent of the origin O1 may be defined as the Y axis of the tentative coordinate system CS1. Alternatively, in the case where the welding line WL is a line formed of a combination of a straight line, a curved line, etc., a point included in the straight line may be preferentially set as the origin O1.

Although the target angle $\alpha 1$ is set to be one half of the angle $\alpha 0$ made by the first normal line NL1 and the second normal line NL2 in the control device 2 according to the above embodiment, various modifications about the setting of the target angle $\alpha 1$ are possible. For example, the target angle $\alpha 1$ may be set on the basis of a numerical value accepted via the accepting unit 22 or may be selected from a preset angle range (e.g., 45° to 60°). Furthermore, although the advance angle $\beta 1$ is set according to an operation accepted via the accepting unit 22 in the above embodiment, alternatively, for example, the advance angle $\beta 1$ may be selected from a preset angle range of −20° to +20°. Alternatively, values set in the past and stored in the storage unit 32 may be automatically set for the target angle $\alpha 1$ and the advance angle $\beta 1$.

In the above embodiment, in the case where the welding position of the tool 51 is changed by rotating the tool 51 about an axis, such as the Z axis, in the interference detecting process or the reachability determining process, the tool 51 is rotated stepwise by a preset small angle to set a welding position of the tool 51 that solve problems. In an alternative embodiment, known techniques may be adopted for the method of rotating the tool 51 about an axis, which may be, for example, a manual operation instead of an automatic operation.

Although the control device 2 includes the monitor 21 that can display images in the above embodiment, in an alternative embodiment, the control device 2 need not include the monitor 21.

From the above-described embodiments and modifications thereof, the following aspects of the invention are derived.

The present invention, in one aspect thereof, provides a programming device for a welding robot, the programming device including a model obtaining unit that obtains a three-dimensional model of the welding robot and three-dimensional models of two workpieces to be welded together by a tool of the welding robot; a welding-line specifying unit that specifies a welding line along which the two workpieces are to be welded together, as well as an origin on the welding line, on the basis of the three-dimensional models of the two workpieces; an accepting unit that accepts an operation; a target-angle setting unit that calculates an angle made at the origin by the two workpieces to be welded together as an angle projected onto a plane perpendicular to the welding line and sets a target angle of the tool by using the calculated angle or that sets the target angle on the basis of the operation accepted via the accepting unit; an advance-angle setting unit that sets an advance angle of the tool on the basis of the operation accepted via the accepting unit; a coordinate-system setting unit that sets a tentative coordinate system defined with reference to the origin and a tool coordinate system in accordance with the tool on the basis of the tentative coordinate system; a position setting unit that sets a welding position of the tool on the basis of the newly set tool coordinate system; and a program creating unit that creates an operating program for the welding robot to weld the two workpieces together with reference to the newly set tool coordinate system, wherein three axes constituting the tentative coordinate system include a first axis set on the basis of the welding line, a second axis perpendicular to the first axis and parallel to a face of one of the workpieces to be welded together, and a third axis perpendicular to both the first axis and the second axis, and the tool coordinate system is a coordinate system set by rotating the tentative coordinate system about the first axis of the tentative coordinate in accordance with the target angle and about the third axis of the tentative coordinate in accordance with the advance angle.

According to this aspect, a welding line is specified on the basis of the obtained three-dimensional models of the welding robot and the workpieces. With reference to an origin on the welding line, a tentative coordinate system having a first axis parallel to the welding line, a second axis perpendicular to the first axis and parallel to a face of one of the two workpieces, and a third axis perpendicular to both the first axis and the second axis is set. The tentative coordinate system is rotated about the first axis on the basis of a target angle and is further rotated about the third axis on the basis of the advance angle, and the rotated coordinate system is set as a tool coordinate system. A welding position of the tool is set on the basis of the set tool coordinate system. An operation program for the welding robot is created by using the set tool coordinate system.

That is, according to this aspect, a tool coordinate system obtained by rotating a tentative coordinate system defined with reference to the welding line and one of the workpieces to be welded together is set. In this tool coordinate system, the second axis coincides with the lengthwise direction of the tool, and the user can change the welding position of the tool with reference to the lengthwise direction of the tool when changing the set welding position of the tool, which makes it easier to set the welding position of the tool after the welding position is once set.

In this aspect, the programming device may further include an interference detecting unit that detects, by using the three-dimensional robot of the welding robot and the three-dimensional models of the two workpieces in a virtual space, interference that occurs between the welding robot and the two workpieces in the case where welding is performed along the welding line with the set welding position, and in the case where the interference is detected, the position setting unit may set a new welding position that resolve the interference by rotating the tool coordinate system about at least one of the first axis, the second axis, and the third axis.

Accordingly, while two workpieces are being welded together, a welding position of the tool with which interference does not occur between the welding robot and the workpieces is automatically set, and the two workpieces are welded together with the welding position.

In the above aspect, the model obtaining unit may further obtain a three-dimensional model of a peripheral device disposed in the periphery of the welding robot or the workpieces, and the interference detecting unit, by also using the three-dimensional model of the peripheral device in the virtual space, may detect interference between the welding robot and the two workpieces as well as the peripheral device in the case where welding is performed along the welding line with the set welding position.

Because the three-dimensional model of the peripheral device is also obtained, a welding position of the tool is automatically set while considering interference between the welding robot and the workpieces and also considering interference between these and the peripheral device.

In the above aspect, in the case where the interference is detected, the position setting unit may rotate the tool about the second axis to determine whether or not the interference can be solved, may set a new welding position rotated about the second axis in the case where the interference can be solved, and may set a new welding position rotated about the first axis and/or the third axis in addition to the second axis in the case where the interference cannot be solved.

Accordingly, in the case where interference will occur with the welding robot or the workpieces, interference is prevented by preferentially rotating the welding position of the tool about the second axis. Thus, it is possible reduce changes in the target angle and the advance angle of the welding position of the tool for preventing interference, compared with initially set angles.

In the above aspect, the programming device may further include a reachability determining unit that determines reachability of the tool from a start point to an end point of the welding line with the set welding position by using the three-dimensional model of the welding robot and the three-dimensional models of the two workpieces in a virtual space, and in the case where the reachability is denied, the position setting unit may set a new welding position that affords the reachability as a welding position for an unreachable portion on the welding line.

Accordingly, in welding the two workpieces together, a welding position of the tool with which welding can be performed at all the points on the designated welding line is automatically set.

In the above aspect, the position setting unit may rotate the welding position of the tool for the unreachable portion on the welding line about the second axis to determine the reachability in the case where the reachability is denied, may set a new welding position rotated about the second axis in the case where the reachability is affirmed, and may set a new welding position rotated about the first axis and/or the third axis in addition to the second axis in the case where the reachability is denied.

Accordingly, in the case where there is a portion that cannot be welded along the welding line with the initially set welding position of the tool, the welding position of the tool is rotated preferentially about the second axis, making it possible to perform welding at all the points on the welding line. This makes it possible to reduce changes in the target angle and the advance angle of the welding position of the tool for performing welding at all the points on the welding line, compared with initially set angles.

In this aspect, in the case where an angle range within which the tool is rotatable about the second axis is preset, the position setting unit may set a new welding position rotated about the second axis within the rotatable angle range.

Accordingly, for example, in the case where another component, such as a cord, is attached in the vicinity of the distal end of the tool, since the tool is rotated about the second axis within the preset rotatable angle range, it is possible to prevent interference between the tool and the other component.

In the above aspect, the coordinate-system setting unit may set an axis parallel to the welding line as the first axis.

Accordingly, since the first axis of the tentative coordinate system coincides with the welding line, the user can easily recognize the first axis, which makes it easy for the user to adjust the welding position of the tool with reference to the lengthwise direction of the tool.

In the above aspect, the coordinate-system setting unit may set a midpoint between a start point and an end point of the welding line as the origin.

Accordingly, compared with the case where the tool coordinate system is set with reference to an origin set at the start point or end point of the welding line, an unbiased posture of the tool can be set efficiently.

The present invention, in another aspect thereof, provides a programming method for a welding robot, the programming method including a step of obtaining a three-dimensional model of the welding robot and three-dimensional models of two workpieces to be welded together by a tool of the welding robot; a step of specifying a welding line along which the two workpieces are to be welded together, as well as an origin on the welding line, on the basis of the three-dimensional models of the two workpieces; a step of accepting an operation; a step of calculating an angle made at the origin by the two workpieces to be welded together as an angle projected onto a plane perpendicular to the welding line and setting a target angle of the tool by using the calculated angle or of setting the target angle on the basis of the accepted operation; a step of setting an advance angle of the tool on the basis of the accepted operation; a step of setting a tentative coordinate system defined with reference to the origin and a tool coordinate system in accordance with the tool on the basis of the tentative coordinate system; a step of setting a welding position of the tool on the basis of the newly set tool coordinate system; and a step of creating an operating program for the welding robot to weld the two workpieces together with reference to the newly set tool coordinate system, wherein three axes constituting the tentative coordinate system include a first axis set on the basis of the welding line, a second axis perpendicular to the first axis and parallel to a face of one of the workpieces to be welded together, and a third axis perpendicular to both the first axis and the second axis, and the tool coordinate system is a coordinate system set by rotating the tentative coordinate system about the first axis of the tentative coordinate in accordance with the target angle and about the third axis of the tentative coordinate in accordance with the advance angle.

According to the present invention, even after a welding position of a tool is set, a user is allowed to readily adjust the welding position of the tool with reference to the set welding position by using a tool coordinate system.

The invention claimed is:

1. A programming device for a welding robot, the programming device comprising:
 a processor comprising hardware, the processor being configured to:

obtain a three-dimensional model of the welding robot and three-dimensional models of two workpieces to be welded together by a tool of the welding robot;
specify a welding line along which the two workpieces are to be welded together, as well as an origin on the welding line, on the basis of the three-dimensional models of the two workpieces;
accept an operation;
calculate an angle made at the origin by the two workpieces to be welded together as an angle projected onto a plane perpendicular to the welding line and set a target angle of the tool by using the calculated angle or that sets the target angle on the basis of the operation accepted via the accepting unit;
set an advance angle of the tool on the basis of the operation accepted via the accepting unit;
set a tentative coordinate system defined with reference to the origin and a tool coordinate system in accordance with the tool on the basis of the tentative coordinate system;
set a welding position of the tool on the basis of the newly set tool coordinate system;
create an operating program for the welding robot to weld the two workpieces together with reference to the newly set tool coordinate system; and
detect, by using the three-dimensional robot of the welding robot and the three-dimensional models of the two workpieces in a virtual space, interference that occurs between the welding robot and the two workpieces in the case where welding is performed along the welding line with the set welding position, wherein
three axes constituting the tentative coordinate system include a first axis set on the basis of the welding line, a second axis perpendicular to the first axis and parallel to a face of one of the workpieces to be welded together, and a third axis perpendicular to both the first axis and the second axis,
the tool coordinate system is a coordinate system set by rotating the tentative coordinate system about the first axis of the tentative coordinate in accordance with the target angle and about the third axis of the tentative coordinate in accordance with the advance angle, and
in the case where the interference is detected, the setting of the welding position of the tool sets a new welding position that resolve the interference by rotating the tool coordinate system about at least one of the first axis, the second axis, and the third axis.

2. The programming device for a welding robot according to claim 1,
wherein the obtaining of the three-dimensional model of the welding robot and the three-dimensional models of the two workpieces further obtains a three dimensional model of a peripheral device disposed in the periphery of the welding robot or the workpieces, and
wherein the detecting of the interference, by also using the three-dimensional model of the peripheral device in the virtual space, detects interference between the welding robot and the two workpieces as well as the peripheral device in the case where welding is performed along the welding line with the set welding position.

3. The programing device for a welding robot according to claim 1, wherein, in the case where the interference is detected, the setting of the welding position of the tool rotates the tool about the second axis to determine whether or not the interference can be solved, sets a new welding position rotated about the second axis in the case where the interference can be solved, and sets a new welding position rotated about the first axis and/or the third axis in addition to the second axis in the case where the interference cannot be solved.

4. The programming device for a welding robot according to claim 3, wherein, in the case where an angle range within which the tool is rotatable about the second axis is preset, the setting of the welding position of the tool sets a new welding position rotated about the second axis within the rotatable angle range.

5. The programming device for a welding robot according to claim 1,
wherein the processor is further configured to determine reachability of the tool from a start point to an end point of the welding line with the set welding position by using the three-dimensional model of the welding robot and the three-dimensional models of the two workpieces in a virtual space,
wherein, in the case where the reachability is denied, the setting of the welding position of the tool sets a new welding position that affords the reachability as a welding position for an unreachable portion on the welding line.

6. The programming device for a welding robot according to claim 5, wherein the setting of the welding position of the tool rotates the welding position of the tool for the unreachable portion on the welding line about the second axis to determine the reachability in the case where the reachability is denied, sets a new welding position rotated about the second axis in the case where the reachability is affirmed, and sets a new welding position rotated about the first axis and/or the third axis in addition to the second axis in the case where the reachability is denied.

7. The programming device for a welding robot according to claim 1, wherein the setting of the tentative coordinate system and the tool coordinate system sets an axis parallel to the welding line as the first axis.

8. The programming device for a welding robot according to claim 1, wherein the setting of the tentative coordinate system and the tool coordinate system sets a midpoint between a start point and an end point of the welding line as the origin.

9. A programming method for a welding robot, the programming method comprising:
obtaining a three-dimensional model of the welding robot and three-dimensional models of two workpieces to be welded together by a tool of the welding robot;
specifying a welding line along which the two workpieces are to be welded together, as well as an origin on the welding line, on the basis of the three-dimensional models of the two workpieces;
accepting an operation;
calculating an angle made at the origin by the two workpieces to be welded together as an angle projected onto a plane perpendicular to the welding line and setting a target angle of the tool by using the calculated angle or of setting the target angle on the basis of the accepted operation;
setting an advance angle of the tool on the basis of the accepted operation;
setting a tentative coordinate system defined with reference to the origin and a tool coordinate system in accordance with the tool on the basis of the tentative coordinate system;
setting a welding position of the tool on the basis of the newly set tool coordinate system;

creating an operating program for the welding robot to weld the two workpieces together with reference to the newly set tool coordinate system, detecting, by using the three-dimensional robot of the welding robot and the three-dimensional models of the two workpieces in a virtual space, interference that occurs between the welding robot and the two workpieces in the case where welding is performed along the welding line with the set welding position, wherein three axes constituting the tentative coordinate system include a first axis set on the basis of the welding line, a second axis perpendicular to the first axis and parallel to a face of one of the workpieces to be welded together, and a third axis perpendicular to both the first axis and the second axis, the tool coordinate system is a coordinate system set by rotating the tentative coordinate system about the first axis of the tentative coordinate in accordance with the target angle and about the third axis of the tentative coordinate in accordance with the advance angle, and in the case where the interference is detected, the setting of the welding position of the tool sets a new welding position that resolve the interference by rotating the tool coordinate system about at least one of the first axis, the second axis, and the third axis.

\* \* \* \* \*